US010248790B2

(12) United States Patent
Iwamura et al.

(10) Patent No.: US 10,248,790 B2
(45) Date of Patent: Apr. 2, 2019

(54) INFORMATION PROCESSING SYSTEM, CONTROLLING METHOD, AND CONTROLLING COMPUTER PROGRAM

(71) Applicant: NIPPON TELEGRAPH AND TELEPHONE CORPORATION, Chiyoda-ku (JP)

(72) Inventors: Makoto Iwamura, Musashino (JP); Tomonori Ikuse, Musashino (JP); Mitsuaki Akiyama, Musashino (JP); Kazufumi Aoki, Musashino (JP); Takeo Hariu, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 102 days.

(21) Appl. No.: 15/316,667

(22) PCT Filed: Jun. 10, 2015

(86) PCT No.: PCT/JP2015/066771
§ 371 (c)(1),
(2) Date: Dec. 6, 2016

(87) PCT Pub. No.: WO2015/194438
PCT Pub. Date: Dec. 23, 2015

(65) Prior Publication Data
US 2017/0206356 A1    Jul. 20, 2017

(30) Foreign Application Priority Data

Jun. 17, 2014  (JP) ................. 2014-124599

(51) Int. Cl.
*H04L 29/06*   (2006.01)
*G06F 21/56*   (2013.01)
*G06F 21/53*   (2013.01)

(52) U.S. Cl.
CPC .......... *G06F 21/566* (2013.01); *G06F 21/53* (2013.01); *G06F 21/56* (2013.01); *G06F 2221/033* (2013.01)

(58) Field of Classification Search
CPC ................................... G06F 21/566
See application file for complete search history.

(56) References Cited

U.S. PATENT DOCUMENTS 5,732,080 A *  3/1998  Ferguson ............ H04L 12/5601
370/235
8,127,360 B1   2/2012  Wilhelm et al.
(Continued)

FOREIGN PATENT DOCUMENTS

CN    102075617 A    5/2011
CN    1 02413134 A   4/2012
(Continued)

OTHER PUBLICATIONS

Extended European Search Report dated Nov. 9, 2017 in Patent Application No. 15809912.7.
(Continued)

*Primary Examiner* — Shawnchoy Rahman
(74) *Attorney, Agent, or Firm* — Oblon, McClelland, Maier & Neustadt, L.L.P.

(57) ABSTRACT

A virtual machine includes a shadow memory, a shadow disk, and a virtual NIC. A virtual machine includes a guest OS. The shadow memory and the shadow disk each store therein pieces of data and pieces of tag information assigned to the pieces of data, so as to be kept in correspondence with one another. When malware transmits data, the virtual NIC generates the transmission information containing the transmitted data and tag information assigned to the transmitted data and further transmits the generated transmission information to the virtual machine. The guest OS extracts the tag information from the received transmission information.

(Continued)

Further, the guest OS determines a transfer destination of the transmission information on the basis of the extracted tag information and further transfers the transmission information to the determined transfer destination.

6 Claims, 8 Drawing Sheets

(56) References Cited

U.S. PATENT DOCUMENTS

| | | | | |
|---|---|---|---|---|
| 8,265,063 | B2 * | 9/2012 | Izumi | H04J 3/08 |
| | | | | 370/352 |
| 8,898,788 | B1 * | 11/2014 | Aziz | G06F 21/00 |
| | | | | 726/23 |
| 8,984,638 | B1 | 3/2015 | Aziz et al. | |
| 9,027,135 | B1 * | 5/2015 | Aziz | H04L 63/1408 |
| | | | | 726/23 |
| 9,282,109 | B1 | 3/2016 | Aziz et al. | |
| 2004/0019832 | A1 | 1/2004 | Arnold et al. | |
| 2006/0021029 | A1 | 1/2006 | Brickell et al. | |
| 2007/0250930 | A1 | 10/2007 | Aziz et al. | |
| 2008/0189787 | A1 | 8/2008 | Arnold et al. | |
| 2009/0300751 | A1 | 12/2009 | Krishnamurthy | |
| 2011/0307951 | A1 | 12/2011 | Yermakov et al. | |
| 2011/0307954 | A1 | 12/2011 | Melnik et al. | |
| 2011/0307955 | A1 | 12/2011 | Kaplan et al. | |
| 2011/0307956 | A1 | 12/2011 | Yermakov et al. | |
| 2013/0145463 | A1 | 6/2013 | Ghosh et al. | |
| 2016/0127396 | A1 | 5/2016 | Iwamura et al. | |

FOREIGN PATENT DOCUMENTS

| | | |
|---|---|---|
| EP | 1 932 292 A1 | 6/2008 |
| JP | 2005-534092 A | 11/2005 |
| JP | 2011-257901 A | 12/2011 |
| JP | 2012-83798 A | 4/2012 |
| WO | WO 2006/135903 A2 | 12/2006 |
| WO | 2014/188780 A1 | 11/2014 |

OTHER PUBLICATIONS

International Search Report dated Sep. 15, 2015 in PCT/JP2015/066771 filed Jun. 10, 2015.

Decision to Grant a Patent dated Sep. 27, 2016 in Japanese Application 2016-529276 (with English translation), 4 pages.

Yuhei Kawakoya et al., "Identifying the Code to be Analyzed with Taing Tags", The Institute of Electronics, Information and Communication Engineers, Technical Report of IEICE, Jul. 2012, 6 pages (with English abstract).

Mitsuaki Akiyama et al., "Active Credential Leakage for Observing Web-Based Attack Cycle", RAID 2013, LNCS 8145, 2013, pp. 223-243.

Kazufumi Aoki et al., "Malware behavior analysis using semipermeable network", Anti Malware Engineering Workshop, Oct. 2009, 6 pages (with English abstract).

Office Action dated Jul. 3, 2018 in European Patent Application No. 15 809 912.7.

Office Action dated Nov. 2, 2018 in Chinese Application No. 201580032199.9 (w/computer-generated English translation).

* cited by examiner

| DATA ID | VIRTUAL MEMORY ADDRESS | TAINT TAG ID |
|---|---|---|
| 0001 | 0x0010 | 1 |
| 0002 | 0x0020 | 2 |
| 0003 | 0x0030 | 2 |

FIG.4

| TAINT TAG ID | EXTERNAL TRANSMISSION STATUS |
|---|---|
| 1 | PERMITTED |
| 2 | NOT PERMITTED |

INFORMATION PROCESSING SYSTEM, CONTROLLING METHOD, AND CONTROLLING COMPUTER PROGRAM

FIELD

The present invention relates to an information processing system, a controlling method, and a controlling computer program.

BACKGROUND

Conventionally, methods for analyzing malware can roughly be divided into static analyses and dynamic analyses. Static analyses are methods by which functions of malware are understood by analyzing program codes of the malware. It should be noted that, however, because static analyses are to analyze functions of malware in a comprehensive manner, a large amount of human labor is involved. In contrast, dynamic analyses are methods by which functions of malware are analyzed by preparing an environment in which behavior of malware is recorded and causing the malware to operate in the prepared environment. It is easier to automatize extraction of the behavior in dynamic analyses than in static analyses.

One example of such dynamic analyses of malware is called dynamic taint analyses. During a dynamic taint analysis, for example, in a virtual machine, a virtual Central Processing Unit (CPU) tracks flows of data read and written by malware to and from a virtual memory or a virtual disk. More specifically, the dynamic taint analysis is structured with three phases such as assigning a taint tag, propagating the taint tag, and detecting the taint tag.

For example, when detecting a leak of confidential information by malware, the virtual CPU performs the following processes: In the first phase, the virtual CPU causes the malware to operate. After that, at the stage when a file containing the confidential information is read into a memory, the virtual CPU assigns a taint tag denoting confidential information in correspondence with a storing position, within the memory, of the file containing the confidential information. Normally, the taint tag is stored in a region (which may be referred to as a "shadow memory") prepared separately from a physical memory managed by an Operating System (OS). The region is structured in such a manner that the OS and applications (including malware) are unable to have access thereto.

After that, in the second phase, as a result of the virtual CPU monitoring transfer instructions and the like between registers and memory regions, the taint tag is propagated in accordance with copying of the confidential information. Further, in the third phase, the virtual CPU checks to see whether any of the pieces of data output from a network interface has the taint tag assigned thereto, the taint tag denoting the confidential information. When the taint tag is assigned to any of the output data, the virtual CPU detects that an attempt is made to output the confidential information to the outside.

Further, as an example in which the dynamic taint analysis is applied, another technique is also known by which a breakpoint in a debugger is realized with a taint tag. According to this technique, a user allocates a taint tag in advance to a position where he/she wishes to interrupt a program (i.e., the position where a "breakpoint" is set). Further, a virtual CPU examines the program to see whether a taint tag is assigned in correspondence with any of executed instructions and, when a taint tag is assigned, the virtual CPU interrupts the program. Further, as for destinations of the propagation, yet another technique is also known by which a taint tag is propagated to a disk.

Further, in another example of methods for dynamically analyzing malware, an endeavor has been made to track behaviors of an attacker by configuring File Transfer Protocol (FTP) account information or the like (called a "honey token") prepared in advance into an analysis-purpose personal computer (PC), so as to intentionally cause the malware to leak information. With this arrangement, it is possible to understand in what manner the attacker abuses information obtained thereby.

CITATION LIST

Patent Literature

Patent Literature 1: Japanese Patent Application Laid-open No. 2012-83798

Non Patent Literature

Non Patent Literature 1: Yuhei Kawakoya, Makoto Iwamura, Takeo Hariu, Identifying the code to be analyzed with taint tags, The Institute of Electronics, Information and Communication Engineers, Information and Communication System Security, July 2012

Non Patent Literature 2: Mitsuaki Akiyama, Takeshi Yagi, Kazufumi Aoki, Takeo Hariu, Youki Kadobayashi, Active credential leakage for observing web-based attack cycle, RAID 2013, pp. 223-243

Non Patent Literature 3: Kazufumi Aoki, Yuhei Kawakoya, Makoto Iwamura, Mitsutaka Itoh, Hantousei kasou Internet ni yoru malware no douteki kaiseki, Anti Malware Engineering Workshop, October 2009

SUMMARY

Technical Problem

With the conventional techniques described above, however, a problem remains where it is not possible to analyze the behavior of the malware while preventing other parties from being harmed.

For example, when the dynamic analysis is made by intentionally causing the malware to leak information, it is necessary to transmit the honey token to the attacker side, while using a real Internet network as the communication destination of the malware. In this situation, when being connected to the real Internet network, some malware may perform activities that harm other parties by transmitting spam emails or the like. For this reason, it is necessary to come up with a method that will not harm other parties and by which communication having a possibility of doing harm to other parties can be interrupted or by which communication is continued in a simulating Internet network prepared by an analysist.

As explained above, to dynamically analyze malware, it is necessary to switch between communication destinations in accordance with the purpose of the communication, by selecting from between the real Internet network and the simulating Internet network. According to the conventional method, the switching between the communication destinations is realized by using communication destination Internet Protocol (IP) addresses, Uniform Resource Locators (URLs), and information about communication payloads; however, it is difficult to address the situations when the communication destination is unknown or when the communication payload is obfuscated.

To cope with the circumstances described above, it is an object of the present disclosure to be able to analyze behavior of malware while preventing other parties from being harmed.

Solution to Problem

An information processing system includes a first information processing apparatus that analyzes behavior of malware started up and a second information processing apparatus that transfers transmission information transmitted thereto from the first information processing apparatus. The first information processing apparatus comprises a storage unit and a transmitting unit. The second information processing apparatus comprises an extracting unit and a transfer unit. The storage unit stores therein pieces of data and pieces of tag information assigned to the pieces of data, so as to be kept in correspondence with one another. The transmitting unit, when the malware transmits data, generates the transmission information containing the transmitted data and tag information assigned to the transmitted data and further transmits the generated transmission information to the second information processing apparatus. The extracting unit extracts the tag information from the received transmission information. The transfer unit determines a transfer destination of the transmission information on a basis of the extracted tag information and further transfers the transmission information to the determined transfer destination.

Advantageous Effects of Invention

According to an aspect of the information processing apparatus disclosed herein, an advantageous effect is achieved where it is possible to analyze the behavior of the malware while preventing other parties from being harmed.

DESCRIPTION OF EMBODIMENTS

Exemplary embodiments of an information processing system, a controlling method, and a controlling computer program (hereinafter, "controlling program") of the present disclosure will be explained in detail below, on the basis of the drawings. The invention of the present disclosure is not limited to the described embodiments.

First Embodiment

Figure 1:
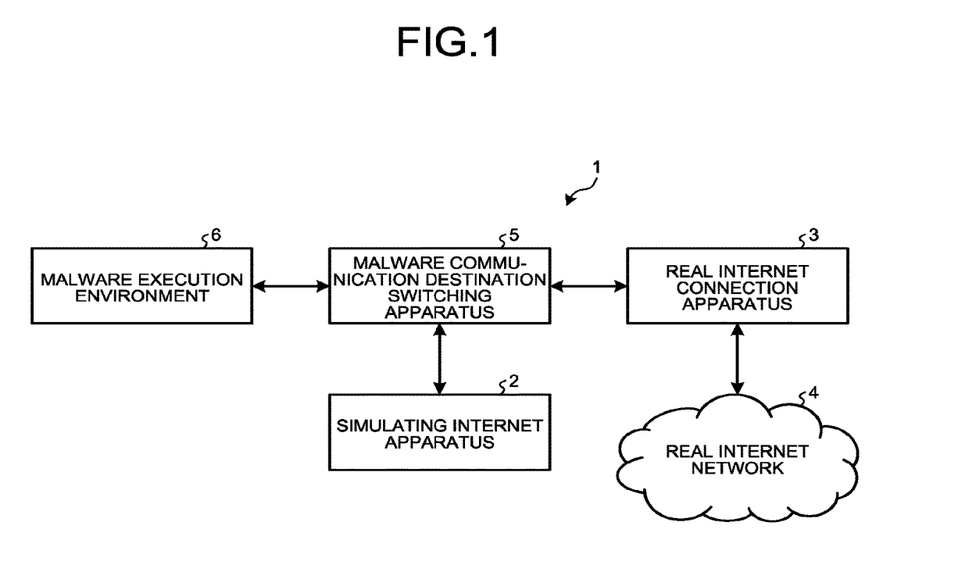
FIG. 1 is a diagram of an exemplary configuration of an information processing system.

FIG. 1 is a diagram of an exemplary configuration of an information processing system 1. As illustrated in FIG. 1, the information processing system 1 includes a simulating Internet apparatus 2, a real Internet connection apparatus 3, and a real Internet network 4, a malware communication destination switching apparatus 5, and a malware execution environment 6.

The simulating Internet apparatus 2 receives and stores therein communication from the malware execution environment 6 via the malware communication destination switching apparatus 5 and, at the same time, assesses the protocol of the communication and generates data corresponding to the protocol. Further, the simulating Internet apparatus 2 transmits the generated data to the malware execution environment 6 as a response. The simulating Internet apparatus 2 is realized with the generation of the server response corresponding to the protocol.

The real Internet connection apparatus 3 controls communication with external apparatuses via the real Internet network 4. The real Internet network 4 is a network connected to the external apparatuses.

The malware execution environment 6 is an environment used for executing malware. In this situation, the word "malware" is a generic term for malicious software.

The malware communication destination switching apparatus 5 is connected to the simulating Internet apparatus 2, the real Internet connection apparatus 3, and the malware execution environment 6 and is configured to, for example, control transfer of information between the malware execution environment 6 and the simulating Internet apparatus 2. Further, the malware communication destination switching apparatus 5 is configured to control transfer of information between the malware execution environment 6 and the real Internet connection apparatus 3. The information processing system 1 will hereinafter be explained on the assumption that information is exchanged in a frame format.

In the information processing system 1 configured as described above, for example, the malware execution environment 6 sets, in advance, such data which the malware has a possibility of making an attempt to reveal in information leakage, as a honey token. In this situation, the "data" may be a computer program (hereinafter, "program") or data referred to by a program. For example, FTP account information (an FTP server, a user name, and a password) prepared by an analysist is written into a setting file used by a prominent FTP client. In that situation, a taint tag is set as attribute information in correspondence with the setting file. Further, the malware execution environment 6 starts up the malware and, when a transmitting process is performed by a virtual network interface (a virtual NIC) included in the malware execution environment 6, the taint tag is transmitted together with transmission data while being kept in correspondence therewith, to the malware communication destination switching apparatus 5.

Further, the malware communication destination switching apparatus 5 receives the data received sent from the malware execution environment 6 and the taint tag associated with the data. After that, the malware communication destination switching apparatus 5 determines whether the transfer destination of the data is the simulating internet apparatus 2 or the real Internet connection apparatus 3, on the basis of the taint tag. For example, when the data has assigned thereto the taint tag indicating the FTP account information, the data will be transferred to the real Internet connection apparatus 3.

In the following sections, an example will be explained in which the simulating Internet apparatus 2, the real Internet connection apparatus 3, the real Internet network 4, the malware communication destination switching apparatus 5, and the malware execution environment 6 are each realized as a virtual machine within a single information processing apparatus.

Figure 2:
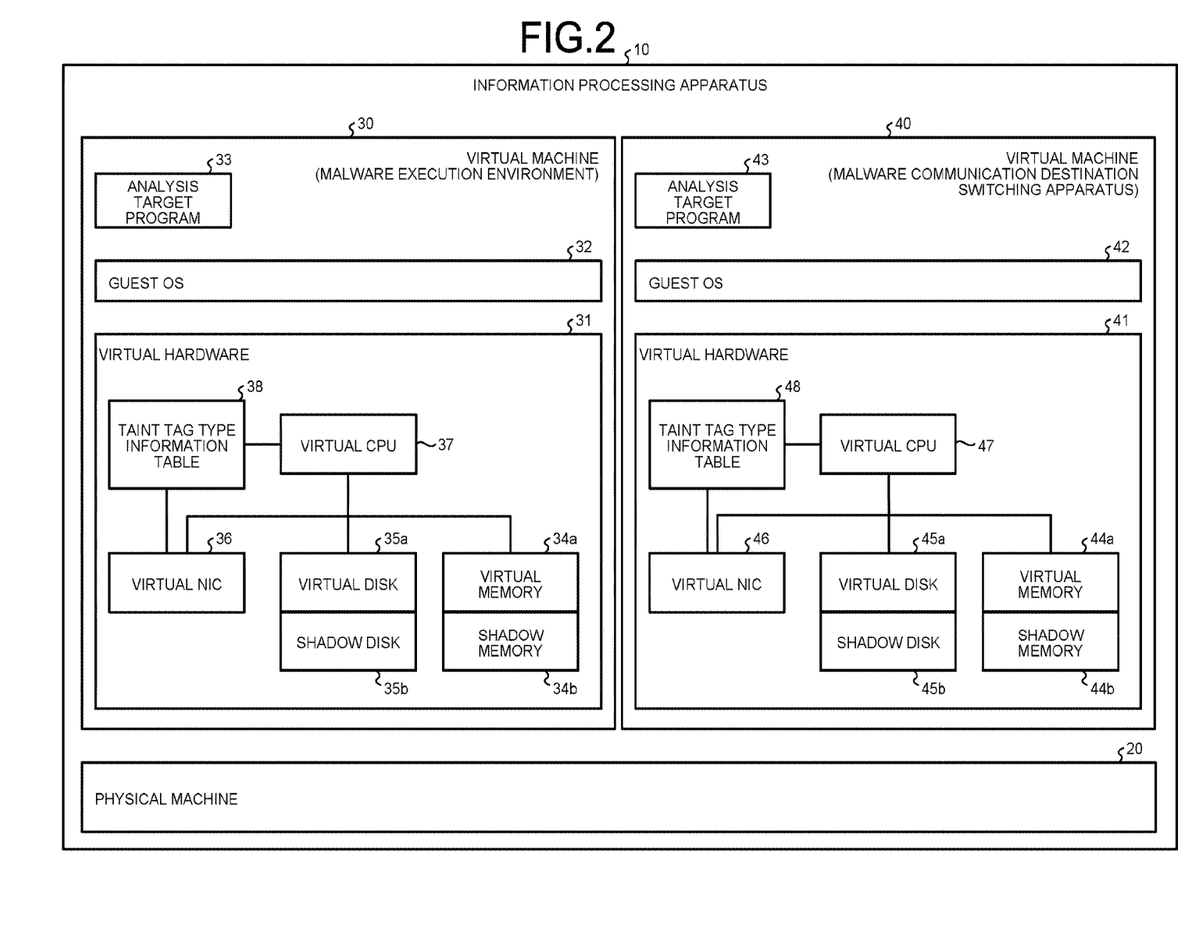
FIG. 2 is a diagram of an exemplary configuration of an information processing apparatus that realizes the information processing system.

FIG. 2 is a diagram of an exemplary configuration of an information processing apparatus 10 that realizes the information processing system 1. FIG. 2 illustrates, from the information processing system 1, only a virtual machine 40 corresponding to the malware communication destination switching apparatus 5 and a virtual machine 30 corresponding to the malware execution environment 6. As illustrated in FIG. 2, the information processing apparatus 10 realizes the virtual machine 30 and the virtual machine 40 in a physical machine 20.

The physical machine 20 includes hardware, a host Operating System (OS), and virtual machine software (not illustrated). The hardware is represented by an electronic circuit and a peripheral device structuring the information processing apparatus 10 and may be a memory and a Central Processing unit (CPU), for example. Further, the hardware stores therein an image file of a disk storing therein an analysis target program 33 (explained later) and an environment used for analyzing the analysis target program 33. In other words, the hardware stores therein an image of a guest OS 32 to be started up in the virtual machine 30. The guest OS 32 will be explained later. Similarly, the hardware stores therein an image file of a disk storing therein an analysis target program 43 (explained later) and an environment used for analyzing the analysis target program 43. In other words, the hardware stores therein an image of a guest OS 42 to be started up in the virtual machine 40. The guest OS 42 will be explained later.

The host OS is an OS serving as a foundation of causing the virtual machine 30 and the virtual machine 40 to operate and is executed by using hardware. The virtual machine software is software that operates in the host OS and offers the virtual machine 30 and the virtual machine 40. For example, the virtual machine software causes the virtual machine 30 to operate by allocating virtual hardware 31 to the guest OS 32. Further, the virtual machine software causes the virtual machine 40 to operate by allocating virtual hardware 41 to the guest OS 42.

The virtual machine 30 includes, for example, the virtual hardware 31, the guest OS 32, and the analysis target program 33. The virtual hardware 31 is a virtual information processing apparatus that executes various types of processes by causing the guest OS 32 to operate while using a virtual disk, a virtual physical memory, a virtual CPU, and the like offered by the virtual machine software. The guest OS 32 causes the analysis target program 33 to operate. The analysis target program 33 is a program or an application to be analyzed in the information processing apparatus 10 and may be malware, for example.

Further, the virtual hardware 31 is a virtual information processing apparatus that executes various types of processes by causing the guest OS 32 to operate and includes a virtual memory 34a, a shadow memory 34b, a virtual disk 35a, a shadow disk 35b, a virtual Network Interface Card (NIC) 36, a virtual CPU 37, and a taint tag type information table 38. The virtual memory 34a, the shadow memory 34b, the virtual disk 35a, the shadow disk 35b, the virtual NIC 36, the virtual CPU 37, the taint tag type information table 38, and the like are offered by the virtual machine software.

The virtual memory 34a is a memory that is virtual and is realized by allocating a predetermined region of the physical memory included in the information processing apparatus 10 as a memory used by the guest OS 32 operating in the virtual machine 30. For example, the virtual memory 34a stores therein a program or data read by the virtual CPU 37 from the virtual disk 35a.

The shadow memory 34b is a data structure storing therein position information that keeps information specifying a storing position within the virtual memory 34a in which data is stored, in correspondence with a taint tag indicating that the data is subject to monitoring. For example, the structure of the shadow memory 34b may be a simple array structure or may be a tree structure that holds the taint tag therein. Further, as for the information stored in the shadow memory 34b, the shadow memory 34b may store therein a value as the taint tag or may store therein a pointer to the data structure that holds taint information therein.

Figure 3:
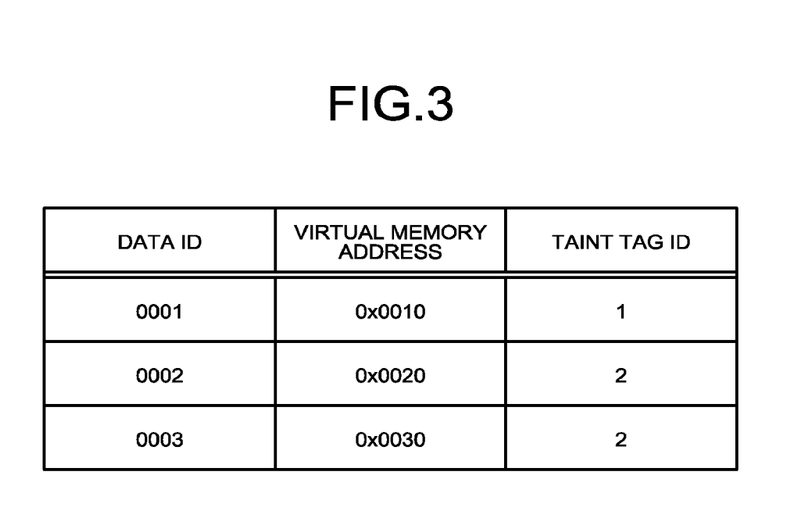
FIG. 3 is a drawing of an example of information stored in a shadow memory.

An example of the shadow memory 34b will be explained, with reference to FIG. 3. FIG. 3 is a drawing of an example of information stored in the shadow memory 34b. As illustrated in FIG. 3, the shadow memory 34b stores therein "data IDs", "virtual memory addresses" and "taint tag IDs" that are kept in correspondence with one another.

In this situation, each of the "data IDs" is an identifier of a piece of data. For example, "0001", "0002", and so on are stored as the "data IDs". Further, each of the "virtual memory addresses" is the position information indicating a storing position within the virtual memory 34a. For example, "0x0010", "0x0020", and so on are stored as the "virtual memory addresses". Each of the "taint tag IDs" is an identifier identifying that the corresponding piece of data is subject to monitoring. For example, "1", "2", and so on are stored as the "taint tag IDs".

In one example, the shadow memory 34b illustrated in FIG. 3 indicates that the piece of data identified with the identifier "0001" is stored at the address "0x0010" in the virtual memory 34a and has the taint tag "1" assigned thereto. Further, the shadow memory 34b illustrated in FIG. 3 indicates that the piece of data identified with the identifier "0002" is stored at the address "0x0020" in the virtual memory 34a and has the taint tag "2" assigned thereto. The numerical values and the like illustrated in FIG. 3 are merely examples, and usable values and the like are not limited to these examples. In this situation, the taint tags are set in advance with pieces of data selected by a user.

The virtual disk 35a is a disk that is virtual and is realized by allocating a predetermined region of the physical disk included in the information processing apparatus 10 as a region to be used by the guest OS 32 operating in the virtual machine 30. For example, the virtual disk 35a stores therein a program to be executed by the virtual CPU 37, data to be processed by a program, and the like.

The shadow disk 35b is a data structure storing therein position information that keeps information specifying a storing position within the virtual disk 35a in which data is stored, in correspondence with a taint tag indicating that the data is subject to monitoring. For example, the structure of the shadow disk 35b may be a simple array structure or may be a tree structure that holds the taint tag therein. Further, as for the information stored in the shadow disk 35b, the shadow disk 35b may store therein a value as the taint tag or may store therein a pointer to the data structure that holds taint information therein. In place of the "virtual memory addresses" stored in the shadow memory 34b, the shadow disk 35b stores therein "virtual disk addresses" each of which is the position information indicating a storing position within the virtual disk 35a. Further, the taint tags are set in advance with pieces of data selected by the user.

Figure 4:
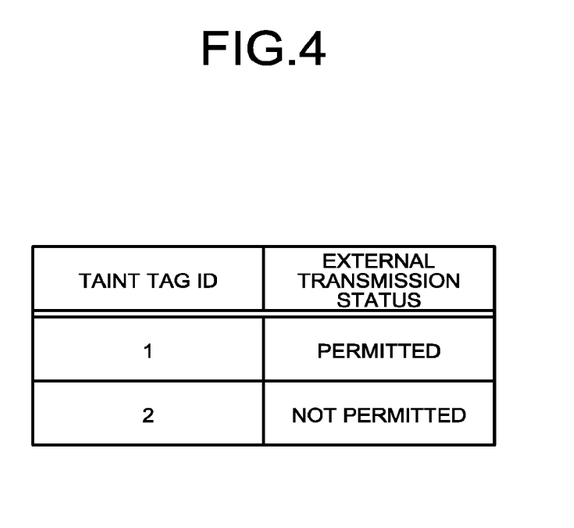
FIG. 4 is a drawing of an example of information stored in a taint tag type information table.

The taint tag type information table 38 stores therein pieces of taint tag type information each of which indicates a transfer destination of the piece of data kept in correspondence with the corresponding taint tag. FIG. 4 is a drawing of an example of the information stored in the taint tag type information table 38. As illustrated in FIG. 4, the taint tag type information table 38 stores therein information in which the "taint tag IDs" and "external transmission statuses" are kept in correspondence with one another.

In this situation, each of the "taint tag IDs" stored in the taint tag type information table 38 is an identifier of a taint tag. For example, values such as "1", "2", and so on are stored as the "taint tag IDs". Further, stored under the "external transmission statuses" in the taint tag type information table 38 are: "Permitted" indicating that communication with the external apparatuses via the real Internet network 4 is permitted; "Not Permitted" indicating that communication with the external apparatuses via the real Internet network 4 is not permitted, and the like. In other words, when an "external transmission status" is indicated as "Permitted", the data is to be transferred to the real Internet connection apparatus 3, whereas when an "external transmission status" is indicated as "Not Permitted", the data is to be transferred to the simulating Internet apparatus 2.

In one example, for the piece of data to which the taint tag ID "1" is assigned, the taint tag type information table 38 illustrated in FIG. 4 indicates that communication with the external apparatuses via the real Internet network 4 is permitted. On the contrary, for the piece of data to which the taint tag ID "2" is assigned, the taint tag type information table 38 illustrated in FIG. 4 indicates that communication with the external apparatuses via the real Internet network 4 is not permitted.

The virtual CPU 37 is a CPU that is virtual and is realized by allocating a predetermined processing capability of the physical CPU included in the information processing apparatus 10 as a CPU used by the guest OS 32 operating in the virtual machine 30. For example, the virtual CPU 37 includes a program execution functional unit and an update functional unit (not illustrated).

Further, the virtual CPU 37 includes a virtual register and a shadow register (not illustrated). The virtual register is a register that is virtual and is realized by allocating a predetermined region of the physical register/the physical memory/the physical disk included in the information processing apparatus 10 as a region to be used by the guest OS 32 operating in the virtual machine 30. For example, the virtual register stores therein a program or data ready by the virtual CPU 37 from the virtual memory 34a. Further, the shadow register is a data structure storing therein position information that keeps information specifying a storing position within the virtual register in which data is stored, in correspondence with a taint tag indicating that the data is subject to monitoring.

The program execution functional unit is a processing unit that executes the program stored in the virtual disk 35a. For example, the program execution functional unit reads the program from the virtual disk 35a and loads the read program into the virtual memory 34a. In other words, the program execution functional unit reads the program to be executed (an execution target program) from the virtual disk 35a, stores the read program into the virtual memory 34a, and subsequently executes the execution target program stored in the virtual memory 34a.

The update functional unit updates the position information that keeps the information indicating the storing position of data in correspondence with a tag, in accordance with a flow of the data. For example, when the data is copied and stored into another storage region or moved to another storage region while the program execution functional unit is executing the analysis target program 33, the update functional unit stores a taint tag so as to be kept in association with the storing position within the storage region indicating the copy destination or the move destination. In this situation, examples of the "storage region" include the virtual register, the virtual memory 34a, and the virtual disk 35a.

More specifically, when a copy or an arithmetic operation occurs between the virtual register and the virtual memory 34a or between the virtual memory 34a and the virtual disk 35a while the analysis target program 33 is being executed, the update functional unit stores the taint tag into any of the shadow register, the shadow memory 34b, and the shadow disk 35b corresponding to the storage regions, so as to be kept in association with the storing position within the storage region indicating the copy destination or the move destination of the data. In other words, the update functional unit propagates the taint tag to the storing position within the storage region indicating the copy destination or the move destination. In the following sections, the shadow register, the shadow memory 34b, and the shadow disk 35b may collectively be referred to as a shadow region.

The virtual NIC 36 is realized as software that is recognized by the guest OS 32 as an NIC and that operates in the physical CPU. Further, as a result of the virtual NIC 36 controlling the physical NIC, the guest OS 32 is able to communicate with the virtual machine 40 (the malware communication destination switching apparatus 5) via the physical NIC.

In this situation, when malware transmits data, the virtual NIC 36 generates a frame containing the transmitted data and a taint tag assigned to the transmitted data and further transmits the generated frame to the virtual machine 40 (the malware communication destination switching apparatus 5). More specifically, the virtual NIC 36 refers to either the shadow memory 34b or the shadow disk 35b and judges whether or not the transmitted data has a taint tag assigned thereto. When having determined that a taint tag is assigned thereto, the virtual NIC 36 generates a frame containing the data and the taint tag. On the contrary, when having determined that no taint tag is assigned to the transmitted data, the virtual NIC generates a frame containing the data.

Figure 5:
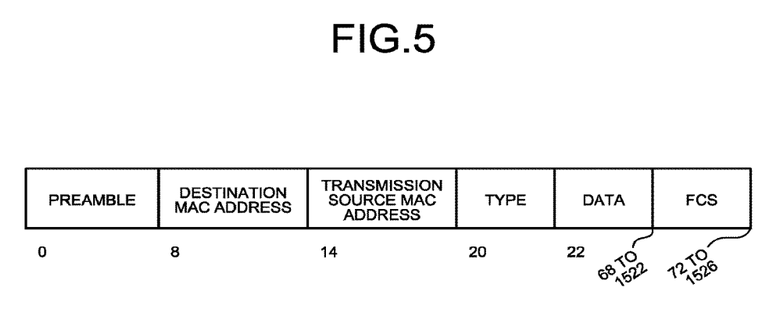
FIG. 5 is a drawing of an example of the structure of a frame generated by a virtual Network Interface Card (NIC) when no taint tag is assigned to data.
Figure 6:
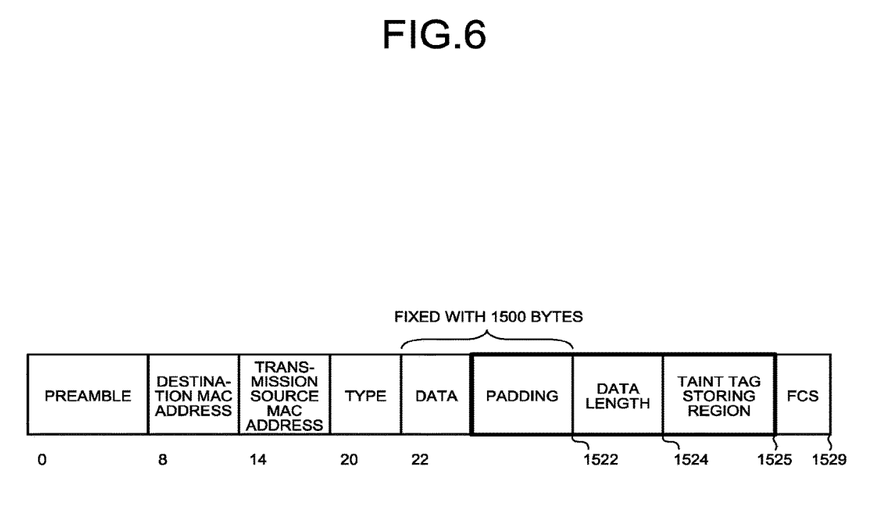
FIG. 6 is a drawing of an example of the structure of a frame generated by the virtual NIC when a taint tag is assigned to data.

The frame generated by the virtual NIC 36 will be explained, with reference to FIGS. 5 and 6. FIG. 5 is a drawing of an example of the structure of a frame generated by the virtual NIC 36 when no taint tag is assigned to the data. FIG. 6 is a drawing of an example of the structure of a frame generated by the virtual NIC 36 when a taint tag is assigned to the data.

As illustrated in FIG. 5, the frame is normally structured with a 8-byte "preamble", a 6-byte "destination MAC address", a 6-byte "transmission source MAC address", a 2-byte "type", a 46- to 1500-byte "data", and a 4-byte "FCS". When no taint tag is assigned to the data, the virtual NIC 36 stores the transmitted data into the "data" section. In this situation, when the data size is smaller than 1500 bytes, the virtual NIC 36 adds a padding starting with the position immediately after the data and up to offset 1521 (the 1521st byte), so that the data length is positioned at offset 1522 (the 1522nd byte).

On the contrary, when a taint tag is assigned to the data, after the virtual NIC 36 receives a data transmission request from the virtual CPU 37, the virtual NIC 36 obtains the size of the transmitted data. After that, as illustrated in FIG. 6, the virtual NIC 36 configures the data size expressed as a 2-byte value into the "data length" section at the 1522nd byte counted from the preamble (hereinafter, "offset"). In this situation, when the data size is smaller than 1500 bytes, the virtual NIC 36 adds a padding starting with the position immediately after the data and up to offset 1521 (the 1521st byte), so that the data length is positioned at offset 1522 (the 1522nd byte). When the data size is at the maximum (1500 bytes), the data size is positioned immediately after the data.

Further, the virtual NIC 36 adds the contents of the shadow memory corresponding to the virtual memory storing therein the transmitted data, to the "taint tag storing region" section starting at offset 1524 (the 1524th byte) and transmits the result as a frame. In other words, when transmitting the data, the virtual NIC 36 stores the taint tag assigned to the data into the region within the frame that has a size exceeding the predetermined maximum transmittable size. The reasons are that, for example, if the virtual NIC 36 transmitted the data and the corresponding taint tag in a separate frame, the number of communicated packets would be doubled, and also, after the data or the taint tag arrives at the recipient, the recipient would need to perform the process of waiting for the taint tag or the data that makes up the pair. In contrast, by storing the data and the taint tag into mutually-the-same frame, the virtual NIC 36 is able to solve these problems. As for the taint tag, one byte may be allocated for each byte of the transmission data. Alternatively, when it is necessary to distinguish among 256 or more combinations of data attributes, it is also acceptable to allocate a taint tag having multiple bytes for each byte of the transmission data. Further, by employing such hardware that is not compatible with jumbo frames, the virtual NIC 36 is able to avoid the situation where the OS requests a transmission of data larger than 1500 bytes.

Next, the virtual machine 40 will be explained. For example, the virtual machine 40 includes the virtual hardware 41, the guest OS 42, and the analysis target program 43. The virtual hardware 41 is a virtual information processing apparatus that executes various types of processes by causing the guest OS 42 to operate while using a virtual disk, a virtual physical memory, a virtual CPU, and the like offered by the virtual machine software. The guest OS 42 causes the analysis target program 43 to operate. The analysis target program 43 is a program or an application to be analyzed in the information processing apparatus 10.

Further, the virtual hardware 41 is a virtual information processing apparatus that executes various types of processes by causing the guest OS 42 to operate and includes a virtual memory 44a, a shadow memory 44b, a virtual disk 45a, a shadow disk 45b, a virtual NIC 46, a virtual CPU 47, and a taint tag type information table 48. The virtual memory 44a, the shadow memory 44b, the virtual disk 45a, the shadow disk 45b, the virtual NIC 46, the virtual CPU 47, the taint tag type information table 48, and the like are offered by the virtual machine software.

Further, the virtual memory 44a included in the virtual hardware 41 has the same functions as those of the virtual memory 34a included in the virtual hardware 31. The shadow memory 44b included in the virtual hardware 41 has the same functions as those of the shadow memory 34b included in the virtual hardware 31. No taint tag is set in advance in the shadow memory 44b. However, a taint tag is set by a storing controlling functional unit (explained later) included in the virtual CPU 47.

Further, the virtual disk 45a included in the virtual hardware 41 has the same functions as those of the virtual disk 35a included in the virtual hardware 31. The shadow disk 45b included in the virtual hardware 41 has the same functions as those of the shadow disk 35b included in the virtual hardware 31. No taint tag is set in advance in the shadow disk 45b. However, a taint tag is set by the storing controlling functional unit (explained later) included in the virtual CPU 47. Further, the taint tag type information table 48 included in the virtual hardware 41 has the same functions as those of the taint tag type information table 38 included in the virtual hardware 31.

The virtual CPU 47 is a CPU that is virtual and is realized by allocating a predetermined processing capability of the physical CPU included in the information processing apparatus 10 as a CPU used by the guest OS 42 operating in the virtual machine 40. The virtual CPU 47 has the same functions as those of the virtual CPU 37, except that the virtual CPU 47 further has the storing controlling functional unit.

When the data contained in the received frame is extracted and is to be stored into the virtual memory 44a, the storing controlling functional unit stores the taint tag into the shadow memory 44b corresponding to the virtual memory 44a serving as a writing destination. For example, when the received data has a taint tag assigned thereto, the storing controlling functional unit stores the data and the taint tag into the shadow memory 44b so as to be kept in correspondence with each other. On the contrary, when the received data has no taint tag assigned thereto, the storing controlling functional unit does not execute the process. Further, regardless of whether the received data has a taint tag assigned thereto or not, the virtual CPU 47 stores the received data into the virtual memory 44a.

The virtual NIC 46 is realized as software that is recognized by the guest OS 42 as an NIC and that operates in the physical CPU. Further, as a result of the virtual NIC 46 controlling the physical NIC, the guest OS 42 is able to communicate with the virtual machine 30 (the malware execution environment 6), the simulating Internet apparatus 2, and the real Internet connection apparatus 3, via the physical NIC.

Further, when having received a frame, the guest OS 42 determines a transfer destination of the frame and further transfers the frame to the determined transfer destination. The guest OS 42 includes an extraction functional unit and a transfer functional unit (not illustrated). In this situation, when using a protocol such as TCP where a packet is exchanged for the purpose of establishing a connection before data is received, the guest OS 42 establishes a TCP session by performing a TCP three-way handshake, for example, so as to receive data and a taint tag corresponding thereto, before the communication destination is confirmed.

For example, the extraction functional unit of the guest OS 42 judges whether or not a taint tag is assigned to the received data. Further, when having determined that a taint tag is assigned, the extraction functional unit of the guest OS 42 extracts the taint tag from the received frame. After that, on the basis of the extracted taint tag, the transfer functional unit of the guest OS 42 determines the transfer destination of the frame.

More specifically, the extraction functional unit of the guest OS 42 judges whether or not a taint tag is assigned to the data, by referring to the frame length of the received frame. When the frame length is 1526 bytes, the extraction functional unit of the guest OS 42 determines that no taint tag is assigned to the data. In contrast, when the frame length is 1529 bytes, the extraction functional unit of the guest OS 42 determines that a taint tag is assigned to the data.

Further, when having determined that a taint tag is assigned to the data, the extraction functional unit of the guest OS 42 extracts the taint tag. For example, the extraction functional unit of the guest OS 42 extracts data having a size equal to the real data starting with offset 1522 (the 1522nd byte) of the frame, as real data. Accordingly, the virtual CPU 47 copies the extracted real data into the virtual memory 44*a*. Further, the extraction functional unit of the guest OS 42 extracts the taint tag starting with offset 1524 (the 1524th byte). Accordingly, the virtual CPU 47 copies the extracted taint tag into the shadow memory 44*b*. As a result, the malware execution environment 6 and the malware communication destination switching apparatus 5 become able to transmit and receive the taint tag to and from each other.

Further, the transfer functional unit of the guest OS 42 refers to the taint tag type information and reads the "external transmission status" kept in correspondence with the extracted taint tag. In this situation, when the "external transmission status" is indicated as "Permitted" where communication with the external apparatuses is permitted, the transfer functional unit of the guest OS 42 transfers the received frame to the real Internet connection apparatus 3. In contrast, when the "external transmission status" is indicated as "Not Permitted" where communication with the external apparatuses is not permitted, the transfer functional unit of the guest OS 42 transfers the received frame to the simulating Internet apparatus 2. In another example, when no taint tag is assigned to the data, the transfer functional unit of the guest OS 42 does not transfer the received frame. Alternatively, when no taint tag is assigned to the data, the transfer functional unit of the guest OS 42 may transfer the received frame to one selected from between the simulating Internet apparatus 2 and the real Internet connection apparatus 3.

Figure 7:
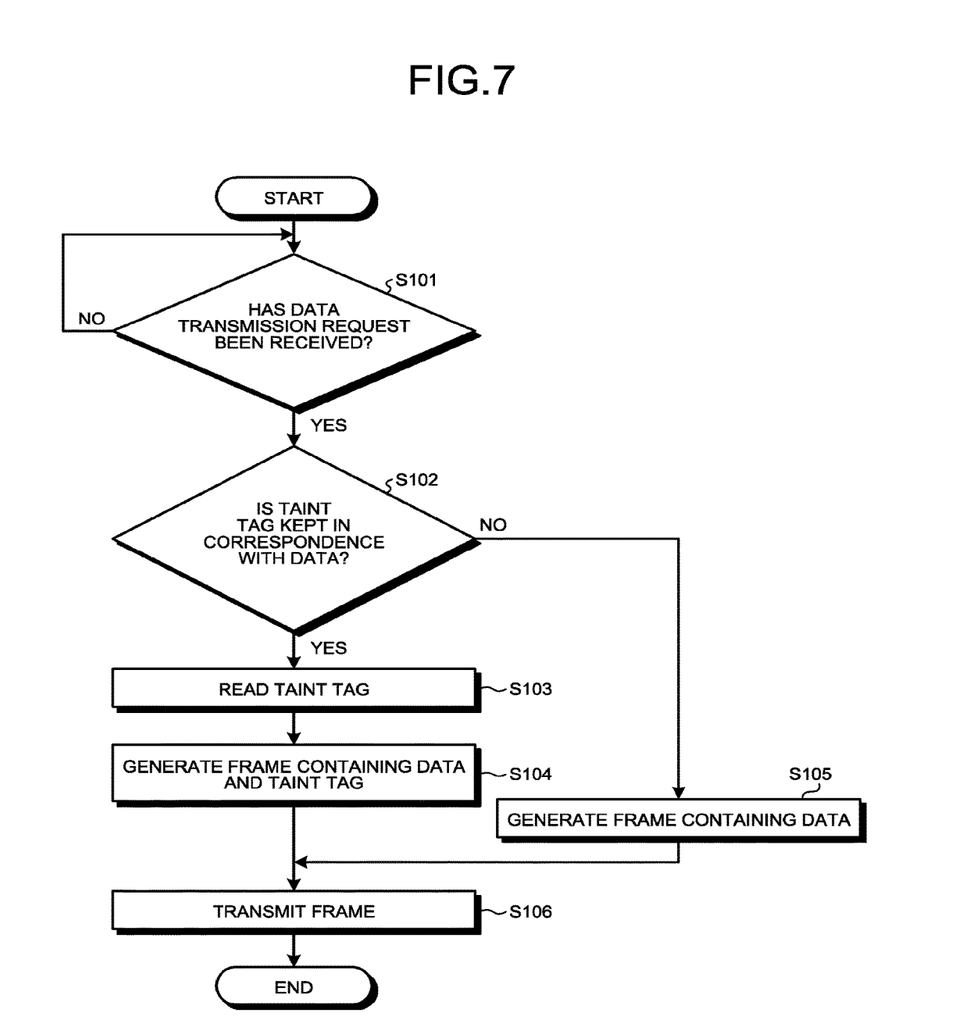
FIG. 7 is a flowchart of a procedure in a process performed by the virtual NIC to generate a frame.

Next, a procedure in a process performed by the virtual NIC 36 included in the virtual machine 30 will be explained, with reference to FIG. 7. FIG. 7 is a flowchart of the procedure in the process performed by the virtual NIC 36 to generate a frame. As illustrated in FIG. 7, the virtual NIC 36 judges whether a data transmission request has been received or not (step S101). When determining that no data transmission request has been received (step S101: No), the virtual NIC 36 repeatedly performs the judging process at step S101.

On the contrary, when determining that a data transmission request has been received (step S101: Yes), the virtual NIC 36 judges whether or not a taint tag is kept in correspondence with the data (step S102). When determining that a taint tag is kept in correspondence with the data (step S102: Yes), the virtual NIC 36 reads the taint tag kept in correspondence with the data (step S103). Further, the virtual NIC 36 generates a frame containing the data and the taint tag (step S104).

On the contrary, when determining that no taint tag is kept in correspondence with the data (step S102: No), the virtual NIC 36 generates a frame containing the data (step S105). After performing the process at either step S104 or step S105, the virtual NIC 36 transmits the generated frame to the virtual machine 40 (step S106) and ends the process.

Figure 8:
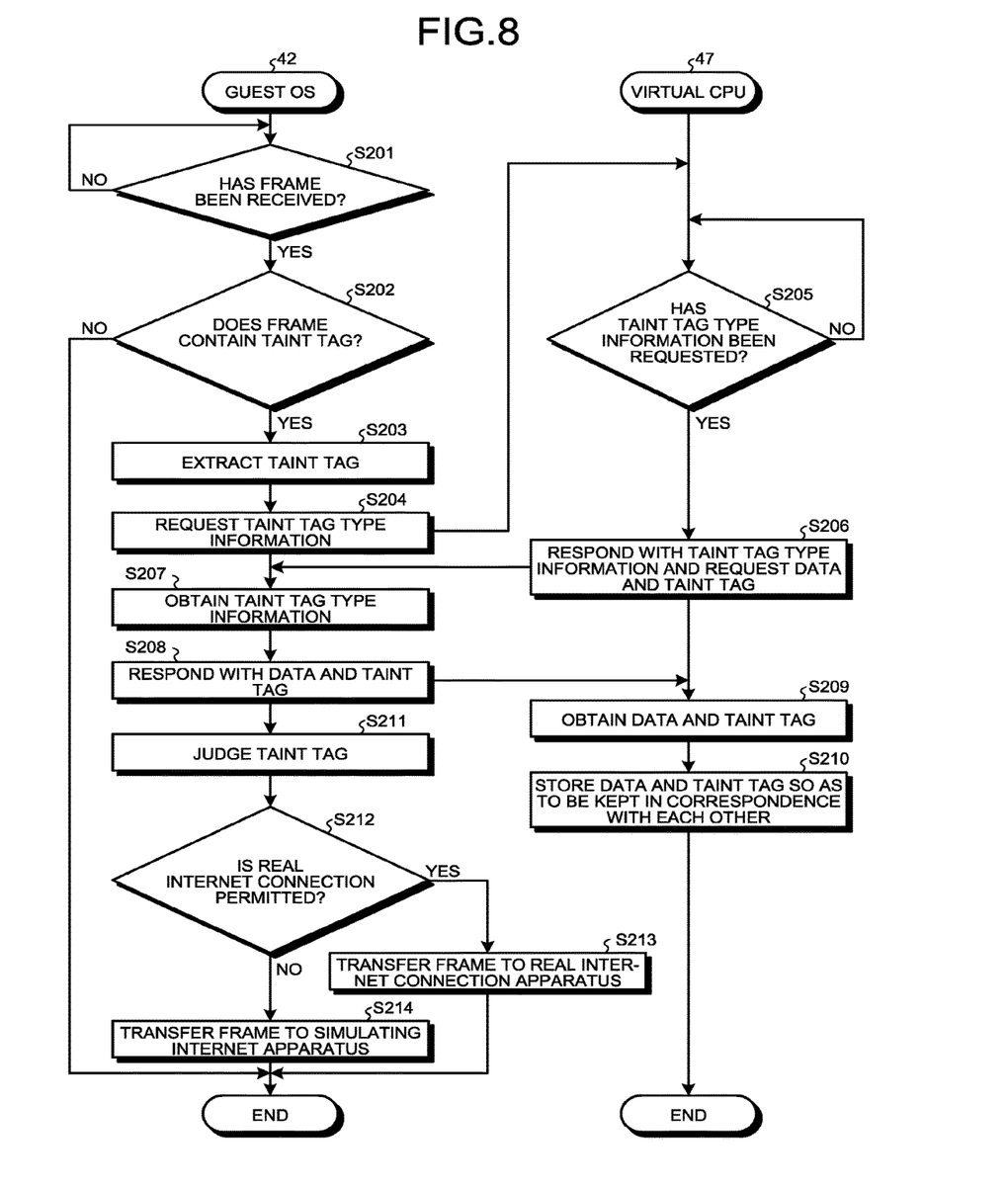
FIG. 8 is a flowchart of a procedure in a process performed by a virtual machine.

Next, a procedure in a process performed by the virtual machine 40 will be explained, with reference to FIG. 8. FIG. 8 is a flowchart of the procedure in the process performed by the virtual machine 40. As illustrated in FIG. 8, the extraction functional unit of the guest OS 42 included in the virtual machine 40 judges whether a frame has been received or not (step S201). When determining that no frame has been received (step S201: No), the extraction functional unit of the guest OS 42 repeatedly performs the judging process at step S201.

On the contrary, when determining that a frame has been received (step S201: Yes), the extraction functional unit of the guest OS 42 judges whether or not a taint tag is contained in the frame (step S202). When determining that a taint tag is contained in the frame (step S202: Yes), the extraction functional unit of the guest OS 42 extracts the taint tag (step S203).

Subsequently, the guest OS 42 requests taint tag type information from the virtual CPU 47 (step S204). On the contrary, when determining that no taint tag is contained in the frame (step S202: No), the extraction functional unit of the guest OS 42 ends the process.

Further, the virtual CPU 47 judges whether or not taint tag type information has been requested (step S205). When determining that taint tag type information has been requested (step S205: Yes), the virtual CPU 47 responds to the guest OS 42 with the taint tag type information and further requests the data and the taint tag from the guest OS 42 (step S206). On the contrary, when determining that no taint tag type information has been requested (step S205: No), the virtual CPU 47 repeatedly performs the judging process at step S205.

The guest OS 42 obtains the taint tag type information (step S207) and responds to the virtual CPU 47 with the data and the taint tag (step S208). After that, the virtual CPU 47 obtains the data and the taint tag (step S209). Subsequently, the storing controlling functional unit of the virtual CPU 47 stores the data and the taint tag into the shadow memory 44*b* so as to be kept in correspondence with each other (step S210). As a result of the storing controlling functional unit of the virtual CPU 47 storing the data and the taint tag into the shadow memory 44*b* so as to be kept in correspondence with each other, for example, it becomes possible to store the data transferred to the outside by referring to the taint tag, for the purpose of analyzing the data later on.

Further, the transfer functional unit of the guest OS 42 judges the taint tag by referring to the taint tag type information (step S211) and judges whether a real Internet connection is permitted or not (step S212). When determining that a real Internet connection is permitted (step S212: Yes), the transfer functional unit of the guest OS 42 transfers the frame to the real Internet connection apparatus 3 (step S213). On the contrary, when determining that a real Internet connection is not permitted (step S212: No), the transfer functional unit of the guest OS 42 transfers the frame to the simulating Internet apparatus 2 (step S214).

As explained above, when the malware is dynamically analyzed in the information processing apparatus 10 according to the first embodiment, it is possible to switch between the communication destinations of the malware with a high level of precision, by arranging the taint tag in the malware execution environment 6 to be propagated in the network.

In the present example, when the malware is dynamically analyzed, there are some situations where the user wishes to purposefully permit communication with an attacker who is present in the network and other situations where the user wishes to interrupt the communication or to transfer the communication to the simulating Internet network so as to prevent other parties from being harmed. According to conventional techniques, it is difficult to determine the communication destination when the communication destination is a completely unknown address or when the communication payload is obfuscated. In contrast, in the information processing apparatus 10 according to the first embodiment, the taint tag is assigned in the malware execution environment 6, in advance, to the information to be transmitted to the attacker, and the malware communication destination switching apparatus 5 is informed of the taint tag. As a result, by referring to the taint tag, the malware communication destination switching apparatus 5 is able to switch between the communication destinations of the malware by selecting from between the simulating Internet network and the real Internet network, without being dependent on the destination IP address or the communication payload.

In the embodiment described above, the example is explained in which the malware communication destination switching apparatus 5 determines the transfer destination by referring to the taint tag type information table 48 and judging whether the communication with the external apparatuses is permitted or not; however, possible embodiments are not limited to this example. For instance, the malware execution environment 6 may be configured so as to assign a taint tag only to such data for which communication with the external apparatuses is permitted. For example, the malware execution environment 6 may assign a taint tag only with respect to FTP account information. In that situation, the malware communication destination switching apparatus 5 transmits the data to the real Internet connection apparatus 3 when a received frame contains the taint tag and transmits the data to the simulating Internet apparatus 2 when no taint tag is present. Alternatively, the malware execution environment 6 may be configured so as to assign a taint tag only to such data for which communication with the external apparatuses is not permitted. For example, the malware execution environment 6 may assign a taint tag only with respect to the malware serving as an analysis target. In that situation, the malware communication destination switching apparatus 5 transmits the data to the simulating Internet apparatus 2 when a received frame contains the taint tag and transmits the data to the real Internet connection apparatus 3 when no taint tag is present.

Alternatively, the malware communication destination switching apparatus 5 may determine the transfer destination by combining a result of checking on the destination IP address or the communication payload with the taint tag.

Further, in the embodiment described above, the example is explained in which the virtual NIC 36 stores the data length at offset 1522 (the 1522nd byte) as illustrated in FIG. 6; however, it is also acceptable to start the taint tag storing region from offset 1522 (the 1522nd byte) without including the data length. In that situation, the size obtained by subtracting 1526 bytes (1522 bytes+the number of bytes of FCS) from the size of the jumbo frame is equal to the size of the taint tag storing region. Accordingly, on the basis of the calculated size, it is possible to determine the size of the real data (which is equal to the size of the taint tag storing region when the taint tag has one bye for each byte of the data). Further, the virtual NIC 36 may generate the frame without padding the data. In that situation, the size obtained by subtracting 28 bytes (22 bytes up to the data+2 bytes for the data length+4 bytes for the FCS) from the size of the jumbo frame is equal to the sum of the size of the data and the size of the taint tag storing region. Accordingly, on the basis of the calculated size, it is possible to determine the size of the real data (which is equal to the value obtained by dividing the calculated size by 2, when the taint tag has one byte for each byte of the data). Further, the virtual NIC 36 may generate the frame without padding the data and without having the data length contained therein.

Further, in the embodiment described above, the example is explained in which the simulating Internet apparatus 2, the real Internet connection apparatus 3, the real Internet network 4, the malware communication destination switching apparatus 5, and the malware execution environment 6 are each realized as a virtual machine within the signal information processing apparatus; however, possible embodiments are not limited to this example. For instance, the simulating Internet apparatus 2, the real Internet connection apparatus 3, the real Internet network 4, the malware communication destination switching apparatus 5, and the malware execution environment 6 may each be realized as a virtual machine in a plurality of information processing apparatuses while being distributed in arbitrary groups. Alternatively, in the information processing system 1, the simulating Internet apparatus 2, the real Internet connection apparatus 3, the real Internet network 4, the malware communication destination switching apparatus 5, and the malware execution environment 6 may each be realized as an independent information processing apparatus.

Second Embodiment

Some of various embodiments of the present invention have thus been explained. It is possible to carry out the present invention in other embodiments besides those described above. Accordingly, some other embodiments will be explained below.

<System Configuration>

With regard to the processes explained in the embodiment described above, it is acceptable to manually perform all or a part of the processes that were described as being performed automatically. Conversely, by using a publicly-known method, it is also acceptable to automatically perform all or a part of the processes that were described as being performed manually. Further, unless noted otherwise, it is acceptable to arbitrarily modify any of the processing procedures, the controlling procedures, specific names, various information including various types of data and parameters that are presented in the above text and the drawings.

Figure 10:
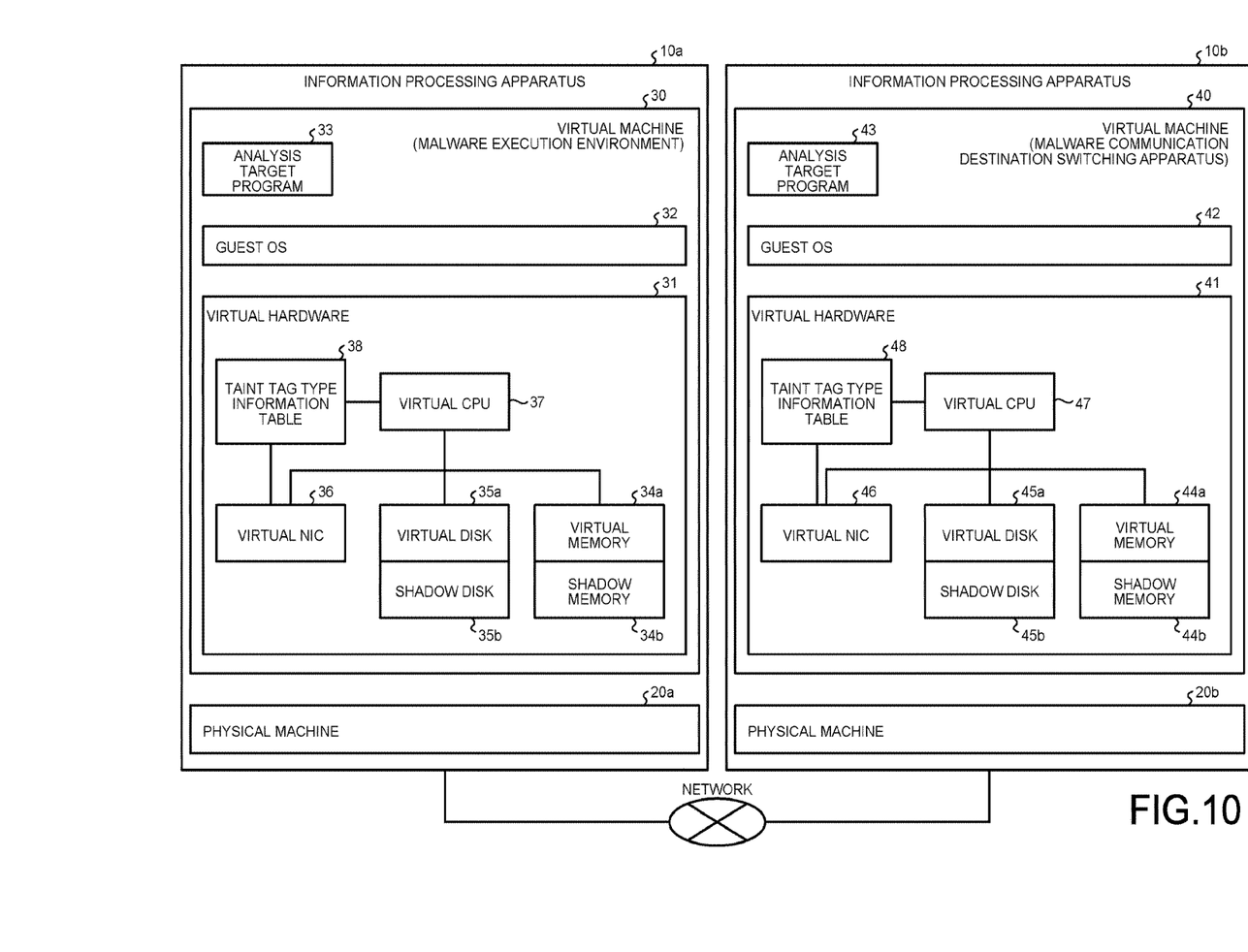
FIG. 10 is a diagram illustrating another exemplary configuration of the information processing apparatus that realizes the information processing system.

The constituent elements of the apparatuses illustrated in the drawings are based on functional concepts. Thus, it is not necessarily required to physically configure the constituent elements as indicated in the drawings. In other words, the specific modes of distributions and integrations of the apparatuses are not limited to those illustrated in the drawings. It is acceptable to functionally or physically distribute or integrate all or a part of the apparatuses in any arbitrary units, depending on various loads and the status of use. For example, the virtual machine 30 and the virtual machine 40 may each be realized with a separate information processing apparatus 10. For example, as illustrated in FIG. 10, the virtual machine 30 may be realized with a physical machine 20a included in an information processing apparatus 10a, while the virtual machine 40 may be realized with a physical machine 20b included in an information processing apparatus 10b. In that situation, the frame transmitted from the virtual machine 30 arrives at the virtual machine 40 via a network (e.g., the Internet) that connects the information processing apparatus 10a and the information processing apparatus 10b to each other.

<Programs>

Further, it is also possible to generate a specific program obtained by writing the processes executed by the information processing apparatus according to the first embodiment above in a language executable by a computer. In that situation, as a result of the computer executing the specific program, it is possible to achieve the same advantageous effects as those achieved in the embodiment described above. Further, it is also acceptable to realize the same processes as those described in the embodiment above, by recording the specific program onto a computer-readable recording medium and causing a computer to read and execute the specific program recorded on the recording medium. In the following sections, an example of the computer that executes a controlling program that realizes the same functions as those of the information processing apparatus 10 illustrated in FIG. 1 and so on will be explained.

Figure 9:
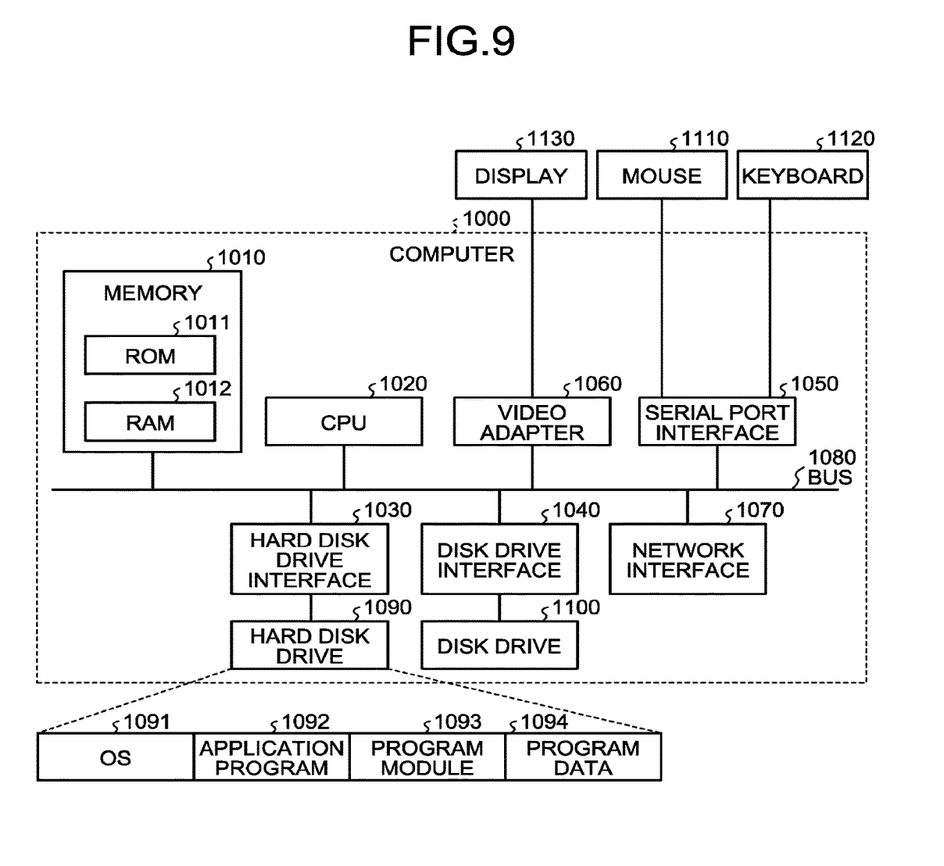
FIG. 9 is a diagram illustrating a computer that executes a controlling computer program.

FIG. 9 is a diagram illustrating a computer 1000 that executes the controlling program. As illustrated in FIG. 9, the computer 1000 includes, for example, a memory 1010, a CPU 1020, a hard disk drive interface 1030, a disk drive interface 1040, a serial port interface 1050, a video adapter 1060, and a network interface 1070. These elements are connected to one another by a bus 1080.

The memory 1010 includes a Read-Only Memory (ROM) 1011 and a Random Access Memory (RAM) 1012. For example, the ROM 1011 stores therein a boot program such as a Basic Input Output System (BIOS) or the like. The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. For example, a mouse 1110 and a keyboard 1120 are connected to the serial port interface 1050. For example, a display 1130 is connected to the video adapter 1060.

In the present example, as illustrated in FIG. 9, the hard disk drive 1090 stores therein, for example, an OS 1091, an application program 1092, a program module 1093, and program data 1094. The controlling program explained in the above embodiment is stored in, for example, the hard disk drive 1090 or the memory 1010.

Further, for example, the controlling program is stored in the hard disk drive 1090, as a program module in which instructions executed by the computer 1000 are written. More specifically, the hard disk drive 1090 stores therein the program module that has written therein a transmitting procedure of causing a first computer to execute the same information processing process as executed by the virtual NIC 36 described in the above embodiment, an extracting procedure of causing a second computer to execute the same information processing process as executed by the extraction functional unit of the guest OS 42 described in the above embodiment, and a transferring procedure of causing the second computer to execute the same information processing process as executed by the transfer functional unit of the guest OS 42.

Further, the data used in the information processing process realized by the controlling program is stored in, for example, the hard disk drive 1090, as program data. Furthermore, the CPU 1020 executes the procedures described above, by reading the program module and the program data stored in the hard disk drive 1090 into the RAM 1012, as necessary.

The program module and the program data related to the controlling program does not necessarily have to be stored in the hard disk drive 1090 and may be, for example, stored in a removable storage medium so as to be read by the CPU 1020 via the disk drive 1100 or the like. Alternatively, the program module and the program data related to the controlling program may be stored in another computer that is connected via a network such as a Local Area Network (LAN) or a Wide Area Network (WAN), so as to be read by the CPU 1020 via the network interface 1070.

<Other Features>

The controlling program explained in the present embodiments may be distributed via a network such as the Internet. Further, it is also acceptable to record the controlling program on a computer-readable recording medium such as a hard disk, a flexible disk (FD), a Compact Disk Read-Only Memory (CD-ROM), a Magneto-Optical (MO) disk, a Digital Versatile Disk (DVD), or the like, so as to be executed as being read from the recording medium by a computer.

REFERENCE SIGNS LIST 10, 10a, 10b INFORMATION PROCESSING APPARATUS
20, 20a, 20b PHYSICAL MACHINE
30, 40 VIRTUAL MACHINE
31, 41 VIRTUAL HARDWARE
32, 42 GUEST OS
33, 43 ANALYSIS TARGET PROGRAM
34a, 44a VIRTUAL MEMORY
34b, 44b SHADOW MEMORY
35a, 45a VIRTUAL DISK
35b, 45b SHADOW DISK
36, 46 VIRTUAL NIC
37, 47 VIRTUAL CPU
38, 48 TAINT TAG TYPE INFORMATION TABLE
1000 COMPUTER
1010 MEMORY
1011 ROM
1012 RAM
1020 CPU
1030 HARD DISK DRIVE INTERFACE
1040 DISK DRIVE INTERFACE
1050 SERIAL PORT INTERFACE
1060 VIDEO ADAPTER
1070 NETWORK INTERFACE
1080 BUS
1090 HARD DISK DRIVE
1091 OS
1092 APPLICATION PROGRAM
1093 PROGRAM MODULE
1094 PROGRAM DATA
1100 DISK DRIVE
1110 MOUSE
1120 KEYBOARD
1130 DISPLAY

The invention claimed is:

1. An information processing system including a first information processing apparatus that analyzes behavior of malware started up and a second information processing apparatus that transfers received transmission information transmitted from the first information processing apparatus, wherein the first information processing apparatus comprises:
a memory that stores pieces of data and pieces of tag information assigned to the pieces of data, so as to be kept in correspondence with one another; and
processing circuitry configured to, when the malware transmits data, generate the transmission information containing the transmitted data and tag information assigned to the transmitted data and further transmits the generated transmission information to the second information processing apparatus, and the second information processing apparatus comprises:
processing circuitry configured to
extract the tag information from the received transmission information; and
determine a transfer destination of the transmission information on a basis of the extracted tag information and further transfers the transmission information to the determined transfer destination,
wherein
the second information processing apparatus further stores tag type information that keeps each of the pieces of tag information in correspondence with a piece of information indicating whether or not a piece of data, to which the piece of tag information is assigned, is permitted to be transferred to an external apparatus, and
the processing circuitry of the second information processing apparatus determines the transfer destination of the transmission information by selecting one from between a simulating Internet network and a real Internet network, by referring to the tag type information.

2. The information processing system according to claim 1, wherein the processing circuitry of the second information processing apparatus further stores the data contained in the received transmission information and the tag information assigned to the data into a memory so as to be kept in correspondence with each other.

3. The information processing system according to claim 1, wherein, when transmitting the data, the processing circuitry of the first information processing apparatus stores the tag information assigned to the data into a region within a frame that has a size exceeding a predetermined maximum transmittable size.

4. The information processing system according to claim 2, wherein, when transmitting the data, the processing circuitry of the first information processing apparatus stores the tag information assigned to the data into a region within a frame that has a size exceeding a predetermined maximum transmittable size.

5. A controlling method implemented in an information processing system including a first information processing apparatus that analyzes behavior of malware started up and a second information processing apparatus that transfers received transmission information transmitted from the first information processing apparatus, wherein
the first information processing apparatus includes a storage unit that stores therein pieces of data and pieces of tag information assigned to the pieces of data, so as to be kept in correspondence with one another, and
the controlling method comprises:
a transmitting step that is performed by the first information processing apparatus and is of generating, when the malware transmits data, the transmission information containing the transmitted data and tag information assigned to the transmitted data and further transmitting the generated transmission information to the second information processing apparatus;
an extracting step that is performed by the second information processing apparatus and is of extracting the tag information from the received transmission information; and
a transferring step that is performed by the second information processing apparatus and is of determining a transfer destination of the transmission information on a basis of the extracted tag information and further transferring the transmission information to the determined transfer destination,
wherein
the second information processing apparatus further stores tag type information that keeps each of the pieces of tag information in correspondence with a piece of information indicating whether or not a piece of data, to which the piece of tag information is assigned, is permitted to be transferred to an external apparatus, and
the method further includes determining, by the second information processing apparatus, transfer destination of the transmission information by selecting one from between a simulating Internet network and a real Internet network, by referring to the tag type information.

6. A non-transitory computer readable storage medium having stored therein a controlling program that causes a first computer that analyzes behavior of malware started up and a second computer that transfers received transmission information transmitted from the first computer to execute a process, wherein
the first computer includes a memory that stores therein pieces of data and pieces of tag information assigned to the pieces of data, so as to be kept in correspondence with one another, and
the controlling program causes the first computer to execute a transmitting procedure of generating, when the malware transmits data, the transmission information containing the transmitted data and tag information assigned to the transmitted data and further transmitting the generated transmission information to the second computer, and
the controlling program causes the second computer to execute an extracting procedure of extracting the tag information from the received transmission information and a transferring procedure of determining a transfer destination of the transmission information on a basis of the extracted tag information and further transferring the transmission information to the determined transfer destination,
wherein
the second computer further stores tag type information that keeps each of the pieces of tag information in correspondence with a piece of information indicating whether or not a piece of data, to which the piece of tag information is assigned, is permitted to be transferred to an external apparatus, and
the method further includes determining, by the second computer, transfer destination of the transmission information by selecting one from between a simulating Internet network and a real Internet network, by referring to the tag type information.

* * * * *